United States Patent [19]

Sakagami et al.

[11] Patent Number: 5,142,380
[45] Date of Patent: Aug. 25, 1992

[54] IMAGE DATA PROCESSING APPARATUS

[75] Inventors: Koubun Sakagami, Yokohama; Masafumi Tanaka, Osaka; Eiichi Maeda, Kawasaki, all of Japan

[73] Assignee: Ricoh Company, Ltd., Japan

[21] Appl. No.: 600,371

[22] Filed: Oct. 18, 1990

[30] Foreign Application Priority Data

| Oct. 23, 1989 | [JP] | Japan | 1-273770 |
| Dec. 20, 1989 | [JP] | Japan | 1-328133 |
| Jan. 9, 1990 | [JP] | Japan | 2-1084 |
| Mar. 16, 1990 | [JP] | Japan | 2-63956 |

[51] Int. Cl.⁵ .................................... H04N 1/419
[52] U.S. Cl. ............................. 358/432; 358/479; 358/909; 382/56
[58] Field of Search .............. 358/432, 135, 105, 433, 358/427, 133, 85, 429, 479, 909; 375/122, 27, 31; 360/48; 382/56

[56] References Cited

U.S. PATENT DOCUMENTS

| 4,541,012 | 9/1985 | Tescher | 358/133 |
| 4,888,795 | 12/1989 | Ando et al. | 379/53 |
| 4,939,583 | 7/1990 | Tsuboi et al. | 358/427 |
| 5,016,010 | 5/1990 | Sugiyama | 375/122 |

FOREIGN PATENT DOCUMENTS 3735349 4/1988 Fed. Rep. of Germany.
3717399 12/1988 Fed. Rep. of Germany.

OTHER PUBLICATIONS

H. C. Musmann et al, "Advances in Picture Coding," *Proceedings of the IEEE*, vol. 73, No. 4, Apr. 1985, pp. 523-548.
A. Habibi, "An Adaptive Strategy for Hybrid Image Coding," *IEEE Transactions on Communications*, vol. Com-29, No. 12, Dec. 1981, pp. 1736-1740.
H. Kazmierczak, "Erfassung und maschinelle Verarbeitung von Bilddaten," *Springer-Verlag*, Dec. 30, 1980, pp. 104-107.
W. K. Pratt, "Digital Image Processing," *John Wiley & Sons*, 1978, pp. 232-247 and 630-641.
P. A. Wintz, "Transform Picture Coding," *Proceedings of the IEEE*, vol. 60, No. 7, Jul. 1972, pp. 809-820.

Primary Examiner—Edward L. Coles, Sr.
Assistant Examiner—Chi V. Lam
Attorney, Agent, or Firm—Mason, Fenwick & Lawrence

[57] ABSTRACT

An image data processing apparatus includes a converter for subjecting each block to a discrete cosine transform (DCT) to convert blocks into DCT coefficients, a first memory for temporarily storing the DCT coefficients, a second memory for storing threshold values of a quantization matrix which is used for quantizing the DCT coefficients, a quantizing part for quantizing the DCT coefficients, a differential part for obtaining a difference in D.C. components of quantized DCT coefficients related to present and previous blocks, a zero detector for detecting whether or not A.C. components of the quantized DCT coefficient are zero coefficients, a counter for counting a number of successive zero coefficients of the A.C. components, a coder for subjecting the D.C. and A.C. components to a Huffman coding to output a coded D.C. and A.C. components, a first register for storing an address of an arbitrary DCT coefficient, a comparator for comparing an address where the DCT coefficient is stored in the first memory and the address in the first register, and a second register for holding the DCT coefficient output from the converter when the two compared addresses match.

13 Claims, 14 Drawing Sheets

FIG.3

| i\j | 1 | 2 | 3 | 4 | 5 | 6 | 7 | 8 |
|---|---|---|---|---|---|---|---|---|
| 1 | 16 | 11 | 10 | 16 | 24 | 40 | 51 | 61 |
| 2 | 12 | 12 | 14 | 19 | 26 | 58 | 60 | 55 |
| 3 | 14 | 13 | 16 | 24 | 40 | 57 | 69 | 56 |
| 4 | 14 | 17 | 22 | 29 | 51 | 87 | 80 | 62 |
| 5 | 18 | 22 | 37 | 56 | 68 | 109 | 103 | 77 |
| 6 | 24 | 35 | 55 | 64 | 81 | 104 | 113 | 92 |
| 7 | 49 | 64 | 78 | 87 | 103 | 121 | 120 | 101 |
| 8 | 72 | 92 | 95 | 98 | 112 | 100 | 103 | 99 |

FIG.4

| i\j | 1 | 2 | 3 | 4 | 5 | 6 | 7 | 8 |
|---|---|---|---|---|---|---|---|---|
| 1 | 17 | 18 | 24 | 47 | 66 | 99 | 99 | 99 |
| 2 | 18 | 21 | 26 | 66 | 99 | 99 | 99 | 99 |
| 3 | 24 | 26 | 56 | 99 | 99 | 99 | 99 | 99 |
| 4 | 47 | 66 | 99 | 99 | 99 | 99 | 99 | 99 |
| 5 | 99 | 99 | 99 | 99 | 99 | 99 | 99 | 99 |
| 6 | 99 | 99 | 99 | 99 | 99 | 99 | 99 | 99 |
| 7 | 99 | 99 | 99 | 99 | 99 | 99 | 99 | 99 |
| 8 | 99 | 99 | 99 | 99 | 99 | 99 | 99 | 99 |

FIG.5

| i\j | 1 | 2 | 3 | 4 | 5 | 6 | 7 | 8 |
|---|---|---|---|---|---|---|---|---|
| 1 | 0 | 1 | 5 | 6 | 14 | 15 | 27 | 28 |
| 2 | 2 | 4 | 7 | 13 | 16 | 26 | 29 | 42 |
| 3 | 3 | 8 | 12 | 17 | 25 | 30 | 41 | 43 |
| 4 | 9 | 11 | 18 | 24 | 31 | 40 | 44 | 53 |
| 5 | 10 | 19 | 23 | 32 | 39 | 45 | 52 | 54 |
| 6 | 20 | 22 | 33 | 38 | 46 | 51 | 55 | 60 |
| 7 | 21 | 34 | 37 | 47 | 50 | 56 | 59 | 61 |
| 8 | 35 | 36 | 48 | 49 | 57 | 58 | 62 | 63 |

IMAGE DATA PROCESSING APPARATUS

BACKGROUND OF THE INVENTION

The present invention generally relates to image data processing apparatuses, and more particularly to an image data processing apparatus suited for carrying out an image data compressing process of an electronic still camera which uses solid state image sensors.

Electronic still cameras which use solid state image sensors such as charge coupled devices (CCDs) have been developed to replace the conventional still camera which uses the silver-salt photography technique. The electronic still camera converts light from an object into an electrical signal and records this electrical signal on a recording medium after subjecting the electrical signal to an appropriate signal processing.

FIG. 1 shows an example of a conventional electronic still camera. Light L from an object is imaged on an image sensor 52 via a lens 50 and a shutter 51. A driving circuit 53 subjects the imaged light to a photoelectric conversion and an analog image signal is output from the image sensor 52. The analog image signal is formed into a video signal such as a television signal in a signal processing circuit 54. The output video signal of the signal processing circuit 54 is converted into a digital video signal in an analog-digital (A/D) converter 55 and is temporarily stored in a buffer memory 56 which can store the video signal amounting to one picture. The video signal stored in the buffer memory 56 is subjected to a data compression in a coding circuit 57 and is stored in a memory pack 58.

When picking up an image on the electronic still camera, various adjustments must be made including focal adjustment, exposure adjustment and white balance adjustment. Conventionally, such adjustments require the use of sensors provided exclusively for the adjustments and there is a problem in that it is difficult to realize an inexpensive electronic still camera. In addition, the electronic still camera must have compatibility with other electronic still cameras on the market, and there is a need to standardize the coding system which is employed in the coding circuit 57.

SUMMARY OF THE INVENTION

Accordingly, it is a general object of the present invention to provide a novel and useful image data processing apparatus in which the problems described above are eliminated.

Another and more specific object of the present invention is to provide an image data processing apparatus for processing an input image data which is related to an input image and includes a plurality of blocks which are respectively made up of N×N pixels, where N is an integer greater than or equal to two, and the image data processing apparatus comprises converter means for subjecting each block to a discrete cosine transform to convert the blocks into discrete cosine transform coefficients, first memory means coupled to the converter means for temporarily storing the discrete cosine transform coefficients, second memory means for storing threshold values of a quantization matrix which is used for quantizing the discrete cosine transform coefficients, quantizing means coupled to the first and second memory means for quantizing the discrete cosine transform coefficients read out from the first memory means by dividing the discrete cosine transform coefficients by each of the threshold values read out from the second memory means, differential means coupled to the quantizing means for obtaining a difference in D.C. components of quantized discrete cosine transform coefficients output from the quantizing means and related to present and previous blocks, zero detection means coupled to the quantizing means for detecting whether or not A.C. components of the quantized discrete cosine transform coefficients output from the quantizing means are zero coefficients, counter means coupled to the zero detection means for counting a number of successive zero coefficients of the A.C. components, coding means for subjecting the D.C. components to a Huffman coding by coding the difference output from the differential means to output a coded D.C. component, and for subjecting the A.C. components to a Huffman coding by coding outputs of the zero detection means and the counter means to output a coded A.C. component, first register means for storing an address of an arbitrary discrete cosine transform coefficient out of the N×N discrete cosine transform coefficients of one block in response to an external address data, comparator means coupled to the first register means for comparing an address where the discrete cosine transform coefficient output from the converter means is stored in the first memory means and the address stored in the first register means, and second register means coupled to the converter means and the comparator means for holding the discrete cosine transform coefficient output from the converter means when the two compared addresses match in the comparator means. According to the image data processing apparatus of the present invention, it is unnecessary to provide sensors exclusively for carrying out adjustments such as focal, exposure and white balance adjustments. For this reason, it is possible to realize an inexpensive electronic still camera. Furthermore, since the data compression used is in conformance with the international standard, it is possible to maintain compatibility with other electronic still cameras.

Still another object of the present invention is to provide the image data processing apparatus described first above wherein the coding means includes first size detection means for detecting a size which is a number of bits required to describe the D.C. component of the quantized discrete cosine transform coefficient responsive to the difference output from the differential means, first masking means for outputting only a first number of effective lower bits of the difference output from the differential means depending on the size output from the first size detection means, and third memory means for storing a Huffman table which is used for subjecting the D.C. components to the Huffman coding, where an access to the first table is made by the size output from the first size detection means to output the coded D.C. component and the coded D.C. component from the third memory means and the first effective lower bits output from the first masking means are output as compressed D.C. data, and the coding means further includes second size detection means for detecting a size which is a number of bits required to describe the A.C. component of the quantized discrete cosine transform coefficient output from the quantizing means, second masking means for outputting only a second number of effective lower bits of the quantized discrete cosine transform coefficient output from the quantizing means depending on the size output from the second size detection means, and fourth memory means for storing a Huffman table which is used for subjecting the A.C. components to the Huffman coding, where an access to the second table is made by the size output from the second size detection means to output the coded A.C. component and the coded A.C. component from the third memory means and the second effective lower bits output from the second masking means are output as compressed A.C. data.

A further object of the present invention is to provide the image data processing apparatus described above second which further comprises decoding means for decoding the compressed D.C. data and the compressed A.C. data by a Huffman decoding and for outputting decoded D.C. component and decoded A.C. component, data detection means coupled to the decoding means for extracting the first and second effective lower bits from the respective decoded D.C. and A.C. components, differential decoding means coupled to the data detection means for subjecting the first effective lower bits of the decoded D.C. component to a differential decoding, zero adding means for adding to the second effective lower bits of the decoded A.C. component a number of consecutive zero coefficients decoded by the decoding means, fifth memory means for storing threshold values of a quantization matrix which is used for inverse quantization of the discrete cosine transform coefficients, multiplying means for subjecting the D.C. component output from the differential decoding means and the A.C. component output from the zero adding means to an inverse quantization by multiplying each threshold value read out from the fifth memory means to the D.C. and A.C. components, sixth memory means for temporarily storing the D.C. and A.C. components output from the multiplying means, and inverse discrete cosine transform means for subjecting the D.C. and A.C. components read out from the sixth memory means to an inverse discrete cosine transform to convert the discrete cosine transform coefficients into the blocks.

Another object of the present invention is to provide the image data processing apparatus described above first which further comprises run length counter means and overflow code erasing means. The run length counter means comprises the zero detection means for detecting whether or not the A.C. components of the quantized discrete cosine transform coefficients output from the quantizing means are zero coefficients, the counter means coupled to the zero detection means for counting the number of successive zero coefficients of the A.C. components and for outputting a counted value as a run length data, a data counter for counting a number of input data within each block and for outputting an end of block code when n input data are counted, where n denotes a number of input data within one block, the data counter outputting an overflow code when a counted value therein overflows, and an output controller for outputting a flag data and a shift pulse when the zero detection means detects a non-zero coefficient, the overflow code is output from the counter means or the end of block code is output from the data counter. The overflow code erasing means comprises shift register means for latching the input data, the run length data, the flag data, the overflow code and the end of block code in response to the shift pulse, and a continuity detector for detecting the overflow code which is adjacent to the end of block code out of the overflow code and the end of block code latched in the shift register means, and for erasing the overflow code by clearing the flag data which corresponds to the detected overflow code.

Other objects and further features of the present invention will be apparent from the following detailed description when read in conjunction with the accompanying drawings.

BRIEF DESCRIPTION OF THE DRAWINGS

FIG. 3 is a diagram showing a quantization matrix of a luminance signal;

FIG. 4 is a diagram showing a quantization matrix of chrominance signals;

FIG. 5 is a diagram showing a table indicating a zigzag scanning sequence;

DESCRIPTION OF THE PREFERRED EMBODIMENTS

First, a description will be given of an international standard system for still image data compression used in electronic still cameras, by referring to FIG. 2.

Figure 2:
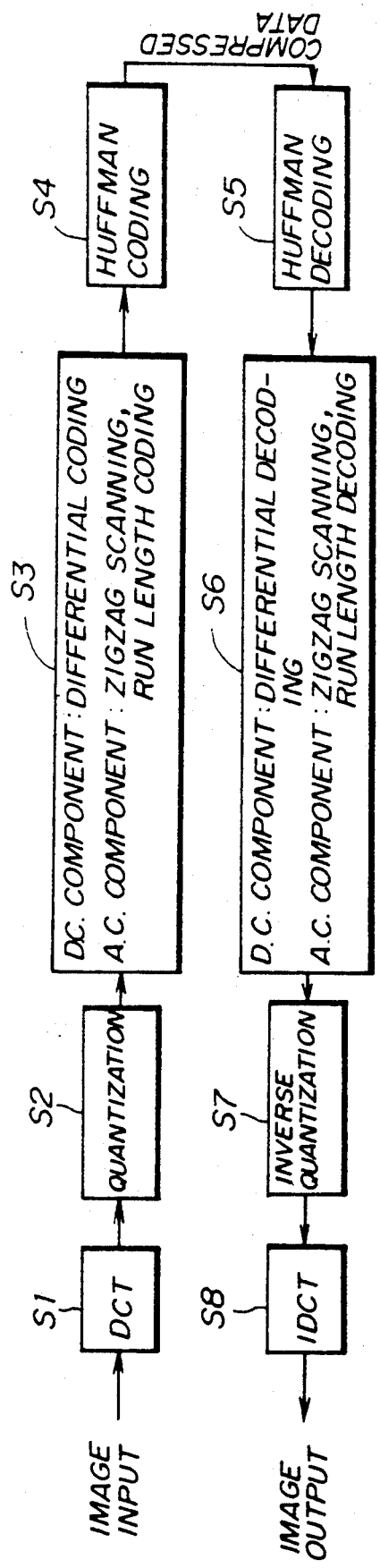
FIG. 2 is a diagram for explaining a "Baseline System" of the international standard system.

In FIG. 2, a step S1 divides an input image into blocks each made up of 8×8 pixels, and subjects each block to a discrete cosine transform (DCT) so as to obtain DCT coefficients. A step S2 makes a quantization by dividing the DCT coefficients by each threshold value of a quantization matrix which is made up of 8×8 threshold values. With respect to the D.C. component of the quantized DCT coefficients, a step S3 obtains a difference between the present D.C. component and the D.C. component which is obtained by the quantization of a previous block, and a step S4 codes a number of bits of this difference according to the Huffman coding. On the other hand, with respect to the A.C. component of the quantized DCT coefficients, the step S3 makes a zigzag scanning within the block to make a conversion into a one-dimensional sequence, and the step S4 codes a number of consecutive zeros (invalid coefficients) and a number of valid coefficients according to the two-dimensional Huffman coding.

The step S2 carries out the quantization by multiplying a coefficient (scale factor) to each threshold value of the quantization matrix. The picture quality and compression rate of the compressed image are adjusted depending on the coefficients. FIG. 3 shows a quantization matrix for a luminance signal Y, FIG. 4 shows a quantization matrix for chrominance signals I and Q, and FIG. 5 shows a table indicating a zigzag scanning sequence.

Steps S5 through S8 respectively carry out processes complementary to the steps S4 through S1. That is, the step S5 carries out a Huffman decoding on the coded image data (compressed image data). The step S6 carries out a differential decoding with respect to the D.C. component and carries out a run length decoding by the zigzag scanning with respect to the A.C. component. In addition, the step S7 carries out an inverse quantization and the step S8 carries out an inverse DCT (IDCT). Therefore, the image data which is compressed in the steps S1 through S4 is expanded in the steps S5 through S8.

According to the Huffman coding, the quantized coefficient value itself is not used both for the D.C. component and the A.C. component, and the number of bits required to describe the coefficient value is subjected to the Huffman coding. The value of the number of bits is added independently to the Huffman code as additional information. For example, when the quantized coefficient is "2" in decimal, this quantized coefficient in binary becomes "000 . . . 010". In this case, the number of bits required to describe this quantized coefficient, that is, the number "2", is subjected to the Huffman coding as the value representing the quantized coefficient. Hence, data "10" which is made up of only 2 bits is added to the Huffman code as added bits (additional information).

When the quantized coefficient has a negative value, the data obtained by subtracting "1" from the added bits is added to the Huffman code. For example, when the quantized coefficient has a value "−2" in decimal, this quantized coefficient in binary becomes "111 . . . 110". In this case, the lower 2 bits are the added bits, and data "01" which is obtained by subtracting "1" from the lower 2 bits "10 " is added to the Huffman code as the added bits. As a result, the added bits begin with the data "1" when the quantized coefficient has a positive value and begins with the data "0" when the quantized coefficient has a negative value, and it is possible to easily distinguish the polarity of the quantized coefficient.

The image data compression and expansion in conformance with the "Baseline System" are presently studied by computer simulation, and no concrete proposals have been made to realize such image data compression and expansion by hardware. There is a proposed method which uses a digital signal processor (DSP) to process the algorithms of the image data compression and expansion which is in conformance with the "Baseline System", but this proposed method is impractical in that it takes too long a time for the processing.

Therefore, there is a demand to realize the image data compression and expansion in conformance with the "Baseline System" by a simple but high-speed hardware.

Next, a description will be given of a first embodiment of an image data processing apparatus according to the present invention, which realizes the "Baseline System" data compression by hardware.

Figure 6:
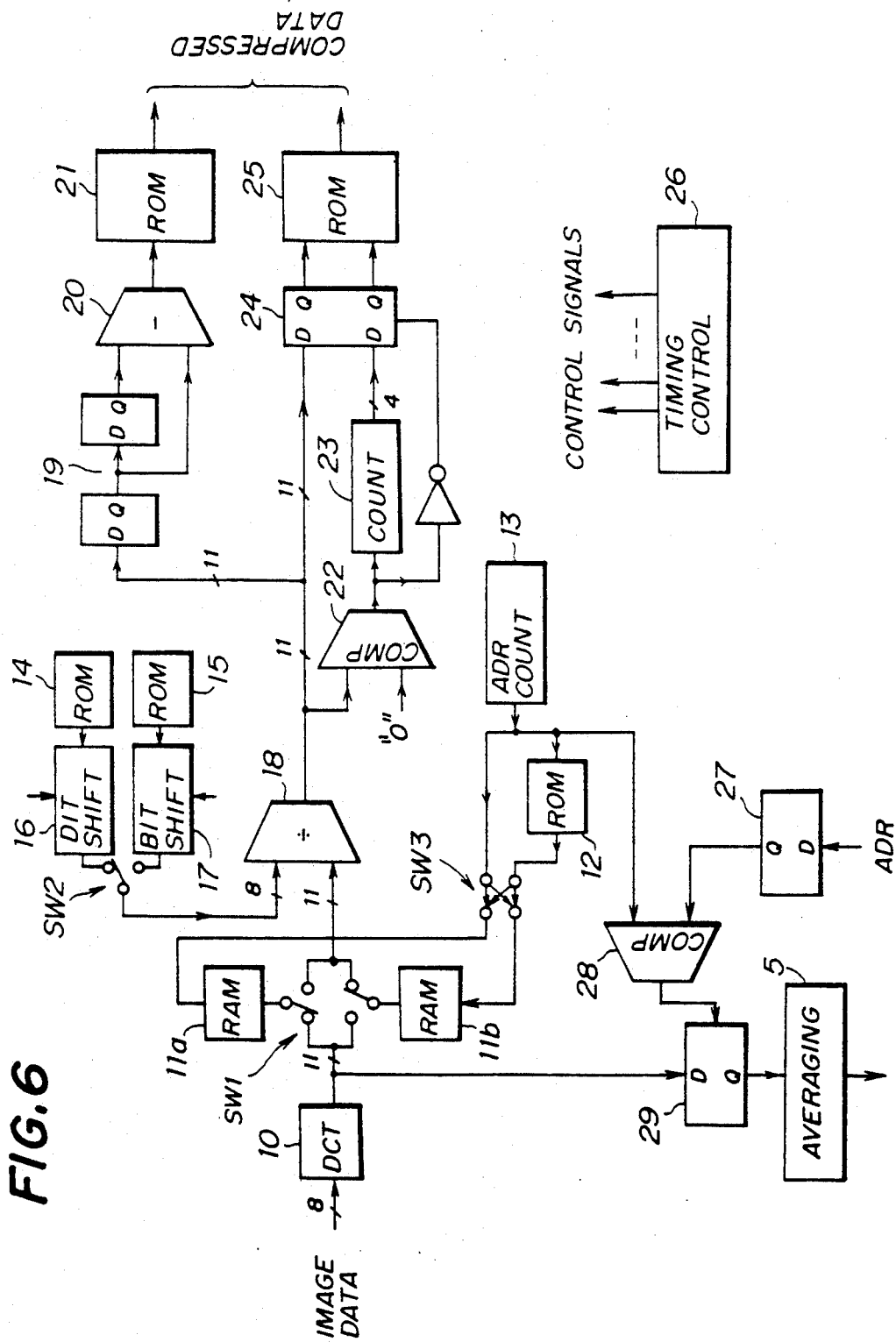
FIG. 6 is a system block diagram showing a first embodiment of an image data processing apparatus according to the present invention.

In the image data processing apparatus shown in FIG. 6, a DCT circuit 10 subjects a block of image data made up of 8×8 pixels to a DCT, and one of random access memories (RAMs) 11a and 11b temporarily stores the DCT coefficient which is obtained by the DCT via a switch SW1. The switch SW1 is controlled by a control signal from a timing control circuit 26 which will be described later, so that the DCT coefficient related to the present block and obtained from the DCT circuit 10 is written into one of the RAMs 11a and 11b while the stored DCT coefficient related to the previous block is read out from the other of the RAMs 11a and 11b and supplied to a divider 18. A read only memory (ROM) 12 stores an address conversion table which is used to read out the DCT coefficient from the RAM 11a or 11b by a zigzag scanning, and an address counter 13 supplies an address data to the RAM 11b or 11a and the ROM 12. The address data from the ROM 12 and the address counter 13 are supplied to the RAMs 11a and 11b via a switch SW3 which is controlled by a control signal from the timing control circuit 26.

A ROM 14 stores threshold values of a quantization matrix for the luminance signal Y, and a ROM 15 stores threshold values of a quantization matrix for the chrominance signals I and Q. Bit shift circuits 16 and 17 multiplying scale factors to the threshold values read from the respective ROMs 14 and 15. A switch SW2 is controlled by a control signal from the timing control circuit 26 depending on whether the luminance signal Y or the chrominance signals I and Q are input to the DCT circuit 10. The divider 18 carries out a quantization by dividing the DCT coefficient read from the RAM 11a or 11b by the output of the bit shift circuit 16 or 17.

A 2-stage register 19 and a subtractor 20 are used for calculating a difference of the present and previous D.C. components of quantized coefficients. A ROM 21 stores a Huffman table for the D.C. component.

A comparator 22 detects a zero coefficient of the quantized A.C. component, and a counter 23 counts a continuity of the zero coefficient, that is, the number of successive zero coefficients. A register 24 stores a non-zero coefficient when the coefficient of the quantized A.C. component is not zero and the number of successive zero coefficients up to that time. A ROM 25 stores a Huffman table for the A.C. component.

The timing control circuit 26 generates various control signals for controlling the operation timing of the entire image data processing apparatus, including the control signals for switching the switches SW1 through SW3. The direct connections of the timing control circuit 26 and the remaining part of the image data processing apparatus are not shown in FIG. 6 so as to avoid the diagram from becoming too complex.

The D.C. component which is obtained as a result of the DCT in the DCT circuit 10 indicates an average value of a region of 8×8 pixels. In addition, the A.C. component which is obtained shows a value similar to the space frequency component. Hence, the values required for the adjustments such as the focal adjustment, exposure adjustment and white balance adjustment can be obtained from the result of the DCT.

Hence, in this embodiment, the image data processing apparatus further includes a register 27, a comparator 28 and a register 29 which are connected as shown in FIG. 6. An address for outputting the DCT coefficient within one block is set in the register 27. The comparator 28 compares the address when the DCT coefficient output from the DCT circuit 10 is stored in the RAM 11a or 11b and the address which is set in the register 27. The register 29 stores the DCT coefficient when the two compared addresses match in the comparator 28.

For example, the address of the D.C. component for one block is set in the register 27. In this case, the D.C. components of the DCT coefficients in all blocks of one picture can be obtained from the register 29. Hence, by obtaining an average value of the D.C. components from the register 29 in an averaging circuit 5, it is possible to obtain a value required for the exposure adjustment when the luminance signal Y is input to the DCT circuit 10 and obtain a value required for the white balance adjustment when the chrominance signals I and Q are input to the DCT circuit 10. In addition, when the address of the A.C. component of an arbitrary order is set in the register 27, it is possible to obtain from the register 29 the A.C. components of the DCT coefficients having the same order in all blocks of one picture. Accordingly, by obtaining an average of the A.C. components from the register 29 in the averaging circuit 5, it is possible to carry out the focal adjustment by adjusting the lens position so that the average value increases.

Therefore, according to this embodiment, it is unnecessary to provide sensors exclusively for use in carrying out the various adjustments such as the focal adjustment, the exposure adjustment and the white balance adjustment. For this reason, it is possible to realize an inexpensive electronic still camera. In addition, because the data compression is in conformance with the international standard system, the image data processing apparatus is especially suited for application to the electronic still camera which must have compatibility with other electronic still cameras.

Figure 7:
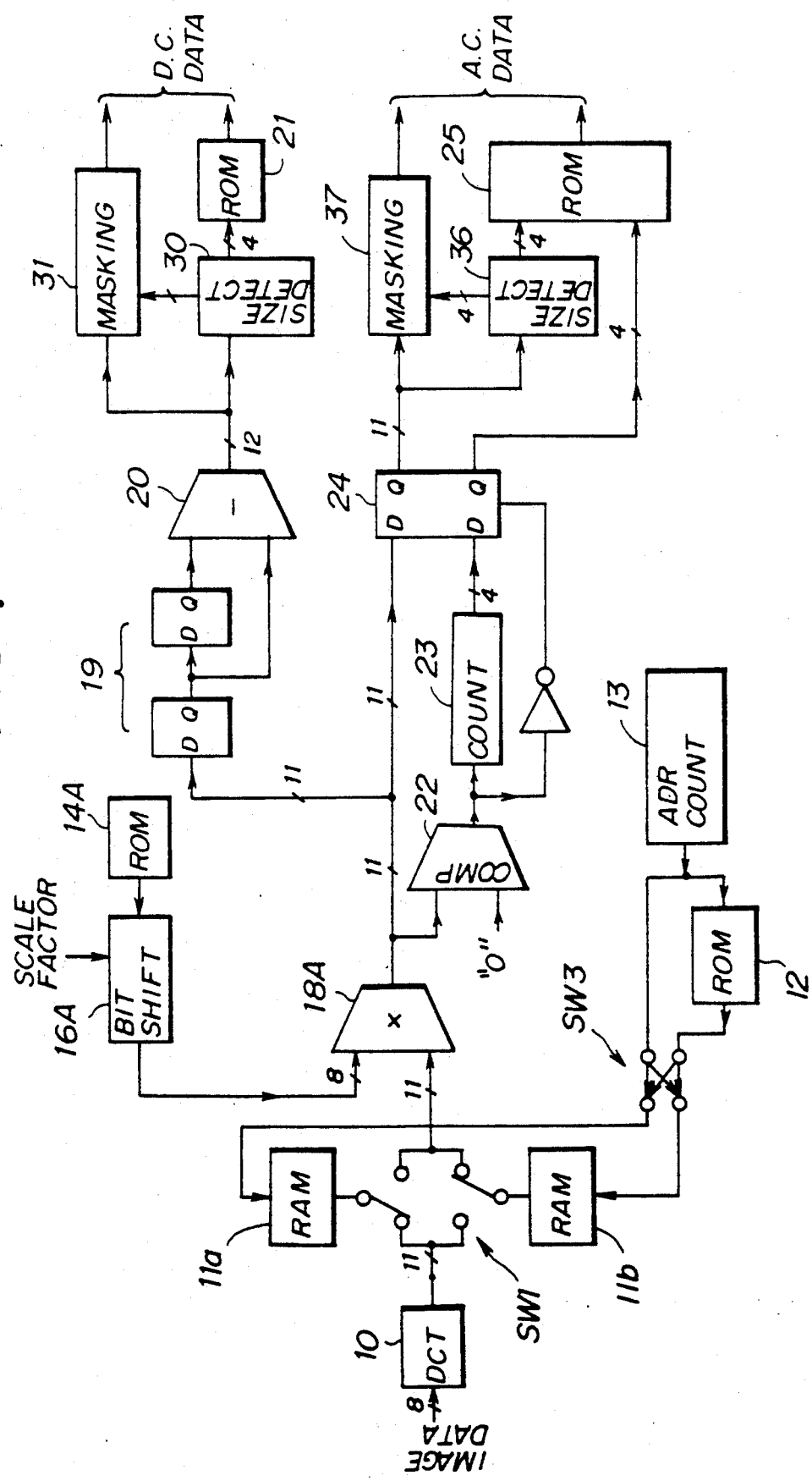
FIG. 7 is a system block diagram showing an essential part of a second embodiment of the image data processing apparatus according to the present invention.

Next, a description will be given of a second embodiment of the image data processing apparatus according to the present invention, by referring to FIG. 7. In FIG. 7, those parts which are the same as those corresponding parts in FIG. 6 are designated by the same reference numerals, and a description thereof will be omitted. Furthermore, the illustration of the timing control circuit 26, the comparator 28, and the registers 27 and 29 is omitted in FIG. 7.

In FIG. 7, a ROM 14A stores inverse numbers of threshold values of a quantization matrix, and a bit shift circuit 16A multiplies a scale factor to each inverse number of the threshold value. A multiplier 18A carries out a quantization by multiplying the inverse number of each threshold value of the quantization matrix output from the but shift circuit 16A to the DCT coefficient which is read out from the RAM 11a or 11b.

In this embodiment, the image data processing apparatus further includes a size detection circuit 30 and a masking circuit 31 which are provided for processing the difference of the D.C. component, and a size detection circuit 36 and a masking circuit 37 which are provided for processing the A.C. component. The size detection circuit 30 detects the number of bits required to describe the quantized DCT coefficient of the D.C. component and outputs only the number of effective lower bits. The masking circuit 31 subtracts "1" from the output of the size detection circuit 30 when the difference of the D.C. component is negative. Similarly, the size detection circuit 36 detects the number of bits required to describe the A.C. component of the quantized DCT coefficient and outputs only the number of effective lower bits. The masking circuit 37 subtracts "1" from the output of the size detection circuit 36 when the difference of the A.C. component is negative.

Figure 8:
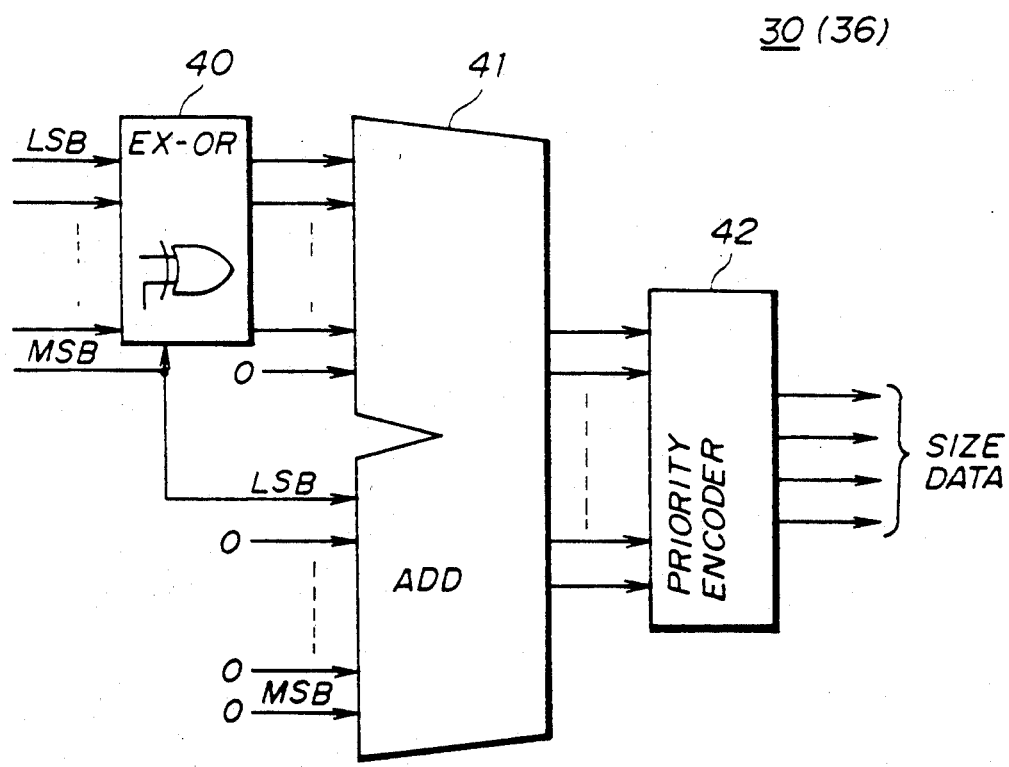
FIG. 8 is a system block diagram showing an embodiment of a size detection circuit of the second embodiment shown in FIG. 7.

FIG. 8 shows an embodiment of the size detection circuit 30 shown in FIG. 7. The size detection circuit 36 may have the same construction as the size detection circuit 30.

The size detection circuit 30 shown in FIG. 8 includes an exclusive-OR circuit 40, an adder 41 and a priority encoder 42. The exclusive-OR circuit 40 inverts the bit data received from the subtractor 20 when the difference of the A.C. component is negative. The adder 41 adds "1" to the output of the exclusive-OR circuit 40. Hence, even when the quantized DCT coefficient is negative, a most significant bit (MSB) of the quantized DCT coefficient becomes "0" by inverting the bits and adding "1". The priority encoder 42 outputs a 4-bit size data indicating the position of the bit "1" which is located closest to the MSB side.

Figure 9:
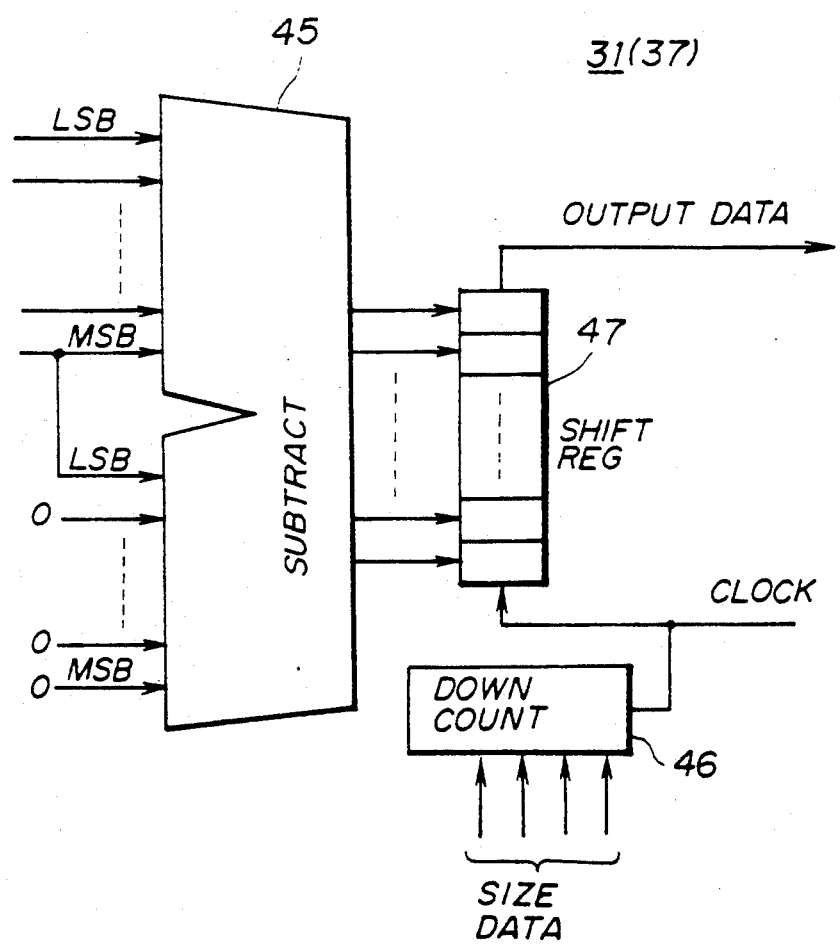
FIG. 9 is a system block diagram showing an embodiment of a masking circuit of the second embodiment shown in FIG. 7.

FIG. 9 shows an embodiment of the masking circuit 31 shown in FIG. 7. The masking circuit 37 may have the same construction as the masking circuit 31.

The masking circuit 31 shown in FIG. 9 includes a subtractor 45, a down counter 46 and a shift register 47. The subtractor 45 subtracts "1" from the difference of the D.C. component when the difference of the D.C. component is negative. The down counter 46 loads the size data received from the size detection circuit 30 and counts down from the loaded value. The shift register 47 outputs the difference of the D.C. component until the counted value in the down counter 46 is counted down to "1" from the loaded value. According to this construction of the masking circuit 31, only the data of the bit size detected by the size detection circuit 30 is output from the masking circuit 31.

Therefore, in this embodiment, when the image data of one block made up of 8×8 pixels is input to the DCT circuit 10, the DCT coefficient which is obtained by the DCT in the DCT circuit 10 is stored in the RAM 11a or 11b. The DCT coefficient which is stored in the RAM 11a or 11b is quantized by being multiplied by the inverse number of each threshold value of the 8×8 quantization matrix which is stored in the ROM 14A. The D.C. component of the quantized DCT coefficient is supplied to the 2-stage register 14, and the subtractor 20 obtains the difference between the present D.C. component and the D.C. component which is obtained by the quantization of the previous block. This difference is supplied to the size detection circuit 30 and the masking circuit 31.

The size detection circuit 30 detects the number of effective bits required to describe the difference data of the D.C. component which is received. The priority encoder 42 of the size detection circuit 30 outputs as the size data the data which describes the bit position of the data "1" located closest to the MSB side. This size data is supplied to the ROM 21 which stores the D.C. Huffman table and is subjected to the Huffman coding. On the other hand, only the effective bits of the difference data which is supplied to the masking circuit 31 are extracted depending on the size data from the size detection circuit 30, and are output as the added bits. Hence, the coded size data from the ROM 21 and the added bits from the masking circuit 31 are output as the D.C. data.

The A.C. component of the DCT coefficient is supplied to the comparator 22 which detects the zero coefficient. When the zero coefficient is detected, the output signal of the comparator 22 starts the counter 23 which counts the number of consecutive zero coefficients. When a non-zero coefficient is received, this data is stored in the register 24, and the counted value in the counter 23 is also stored in the register 24. The effective data (non-zero coefficient or data) of the data stored in the register 24 is supplied to the size detection circuit 36 and the masking circuit 37, and is subjected to processing similar to those of the size detection circuit 30 and the masking circuit 31 described above. The output of the size detection circuit 36 and the data stored in the register 24 and describing the number of consecutive invalid data (zero coefficients or data) are supplied to the ROM 25 which stores the A.C. Huffman table, and are subjected to the Huffman coding. Hence, the coded data from the ROM 21 and the data from the masking circuit 31 are output as the A.C. data.

Next, a description will be given of a third embodiment of the image data processing apparatus according to the present invention, by referring to FIG. 10. The first and second embodiments described above respectively correspond the compression system of the image data processing apparatus. This third embodiment corresponds to the expansion system of the image data processing apparatus.

Figure 10:
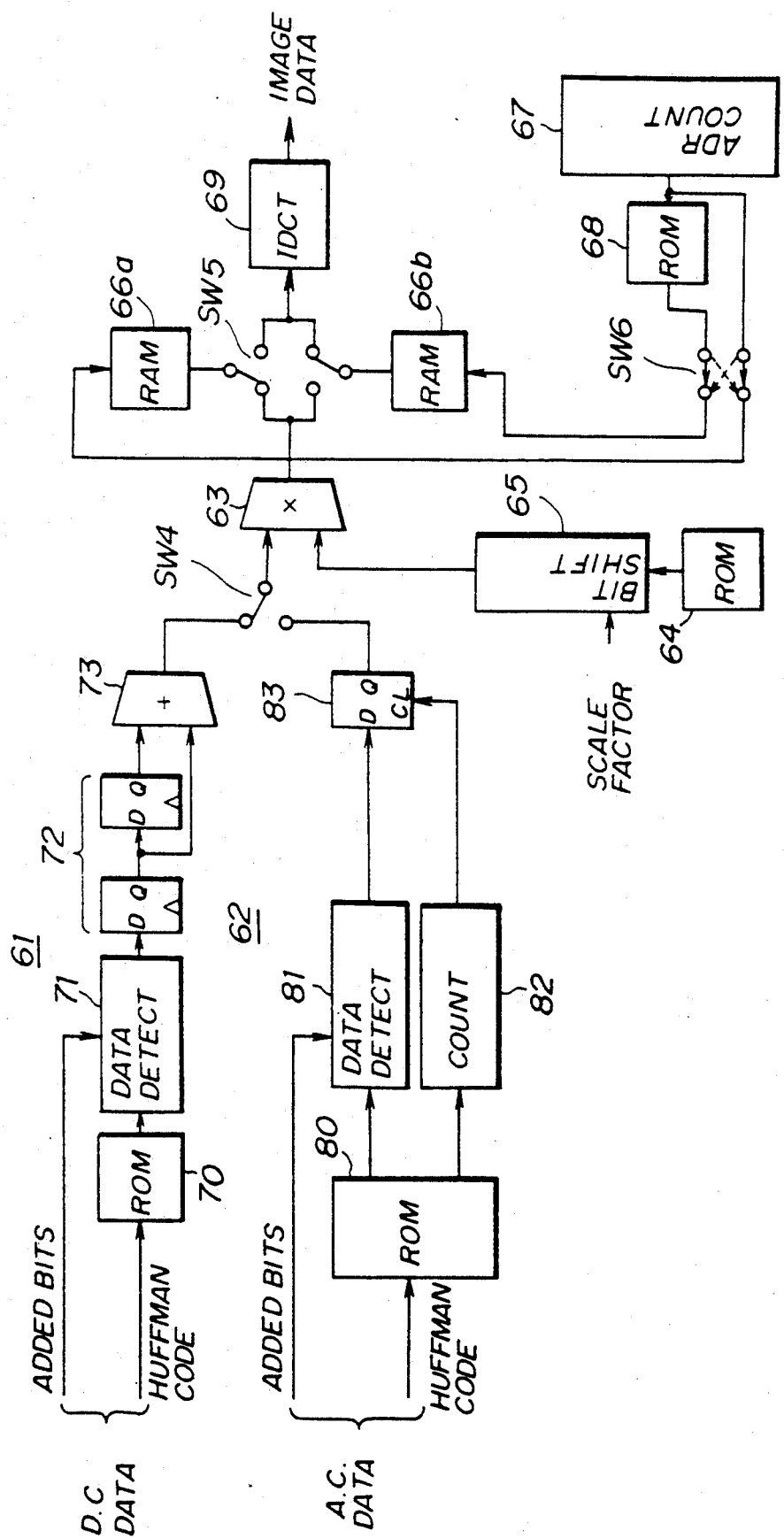
FIG. 10 is a system block diagram showing a third embodiment of the image data processing apparatus according to the present invention.

In FIG. 10, a D.C. data decoding part 61 decodes the D.C. data of the compressed data, and an A.C. data decoding part 62 decodes the A.C. data of the compressed data. For example, the D.C. data is obtained from the ROM 21 and the masking circuit 31 shown in FIG. 7, and the A.C. data is obtained from the ROM 25 and the masking circuit 37.

The D.C. data decoding part 61 includes a ROM 70 which stores a D.C. Huffman table for decoding the data which is related to the number of bits and is coded by the Huffman coding, a data detection circuit 71 for extracting the data related to the number of bits from the added bits decoded by the ROM 70, a 2-stage register 72 for decoding the D.C. data which is coded by the differential coding, and an adder 73.

On the other hand, the A.C. data decoding part 62 includes a ROM 80 which stores an A.C. Huffman table for decoding the data related to the number of bits and the data related to the number of consecutive zero coefficients which are coded by the Huffman coding, a data detection circuit 81 for extracting the data related to the number of bits from the added bits decoded by the ROM 80, a counter 82 for loading the decoded data related to the number of consecutive zero coefficients, and a latch circuit 83 for adding to the A.C. data obtained from the data detection circuit 81 a number of zero coefficients (data) equal to the value loaded in the counter 82 and for storing the value of the non-zero A.C. data.

The decoded D.C. data and A.C. data are supplied to a multiplier 63 via a switch SW4. The switch SW4 is controlled by a control signal from the timing control circuit 26 shown in FIG. 6, for example, and selectively passes one of the D.C. data and the A.C. data. The multiplier 63 also receives each threshold value of the quantization matrix which is read from a ROM 64 is multiplied by a scale factor in a bit shift circuit 65. Hence, the multiplier 63 multiplies the threshold value from the bit shift circuit 65 and the D.C or A.C. data from the switch SW4 so as to carry out an inverse quantization.

Figure 1:
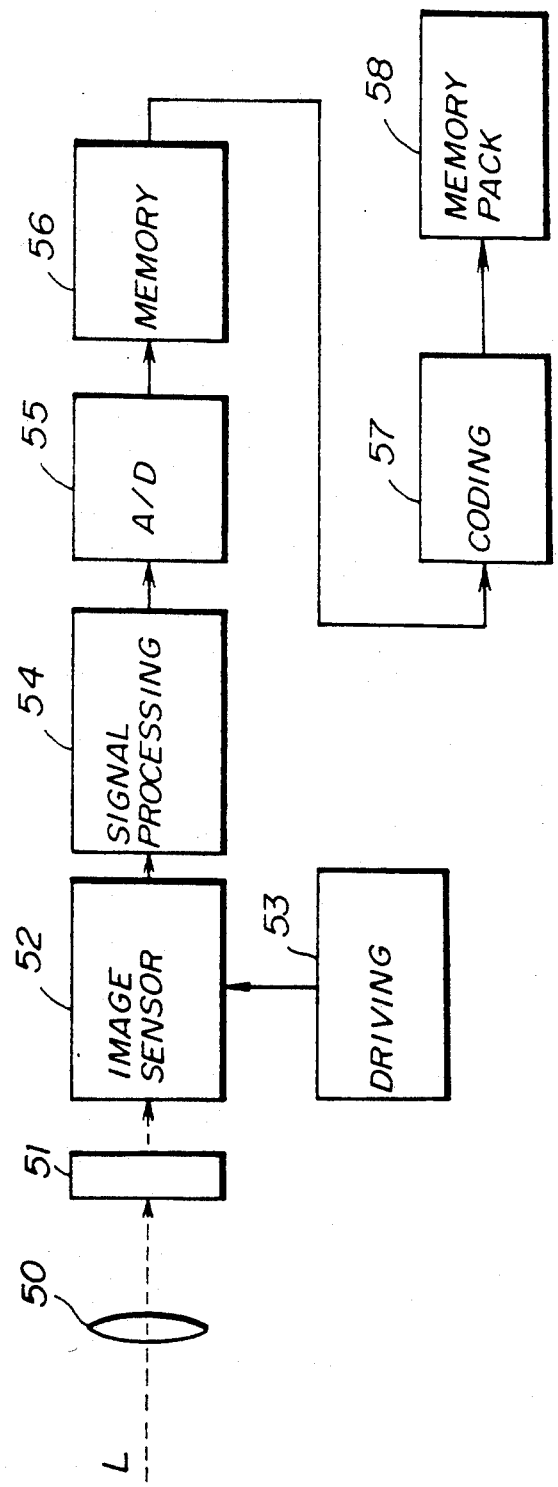
FIG. 1 is a system block diagram showing an example of a conventional electronic still camera.

The data subjected to the inverse quantization in the multiplier 63 is temporarily stored in one of RAMs 66a and 66b via a switch SW5. Similarly as in the case of the switch SW1 shown in FIG. 1, the switch SW5 is controlled by a control signal from the timing control circuit 26 so that the data from the switch SW4 related to the present block is written into one of the RAMs 66a and 66b while the stored data related to the previous block is read out from the other of the RAMS 66a and 66b.

A ROM 68 stores an address conversion table for making a zigzag scanning of the A.C. data stored in the RAM 66a or 66b. An address counter 67 supplies an address data to the RAMs 66b and 66a. The address data from the ROM 68 and the address counter 67 are supplied to the RAMs 66a and 66b via a switch SW6 which is controlled by a control signal from the timing control circuit 26, similarly as in the case of the switch SW3 shown in FIG. 6.

An inverse DCT (IDCT) circuit 68 subjects the data which is received from the RAM 66a or 66b via the switch SW5 to an IDCT and outputs the DCT coefficient which is decoded to the original form.

Therefore, when the compressed image data is received, the Huffman codes are subjected to the Huffman decoding in conformance with the Huffman tables which are stored in the ROMs 70 and 80. In the case where the D.C. data is received as the input compressed image data, the data which is related to the number of bits and is to be decoded is output from the ROM 70 and is supplied to the data detection circuit 71. On the other hand, in the case where the A.C. data is received as the input compressed image data, the data which is related to the number of bits and the data related to the number of consecutive zero coefficients (data) which are to be decoded are output from the ROM 80. In this case, the data related to the number of bits is supplied to the data detection circuit 81, while the data related to the number of consecutive zero coefficients is supplied to the counter 82.

The data detection circuits 71 and 81 respectively extract from the added bits the data which is related to the number of bits and is decoded by the Huffman decoding. The quantized coefficient is positive when the MSB of the added bits is "1", and in this case, the data detection circuits 71 and 81 respectively add "0" to the MSB side. On the other hand, the quantized coefficient is negative when the MSB of the added bits is "0", and in this case, the data detection circuits 71 and 81 respectively add "1" to the MSB side. Hence, the quantized coefficient is returned to the original form when output from the data detection circuits 71 and 81.

Because the D.C. data is a difference data, the 2-stage register 72 and the adder 73 are used to add the D.C. data of the present block and the D.C. data of the previous block. An output of the adder 73 is regarded as the D.C. data of the present block and is supplied to the switch SW4. On the other hand, with respect to the A.C. data, the latch circuit 83 adds to the A.C. data a number of zero coefficients corresponding to the number of consecutive zero coefficients described by the data which is loaded in the counter 82. An output of the latch circuit 83 is regarded as the A.C. data of the present block and is supplied to the switch SW4.

The D.C. data and the A.C. data which are supplied to the switch SW4. Hence, the multiplier 63 multiplies the threshold value from the bit shift circuit 65 and the D.C or A.C. data from the switch SW4 so as to carry out the inverse quantization. The data subjected to the inverse quantization in the multiplier 63 is temporarily stored in one of RAMs 66a and 66b via the switch SW5. The D.C. data read from one of the RAMs 66a and 66b is supplied to the IDCT circuit 69 via the switch SW5 and is subjected to the IDCT. The A.C. data stored in one of the RAMs 66a and 66b is subjected to the zigzag scanning according to the address conversion table which is stored in the ROM 64, and is subjected to the IDCT in the IDCT circuit 69. As a result, the data which is compressed by a compression system such as that shown in FIGS. 6 and 7 is expanded and restored into the original image data.

Figure 11:
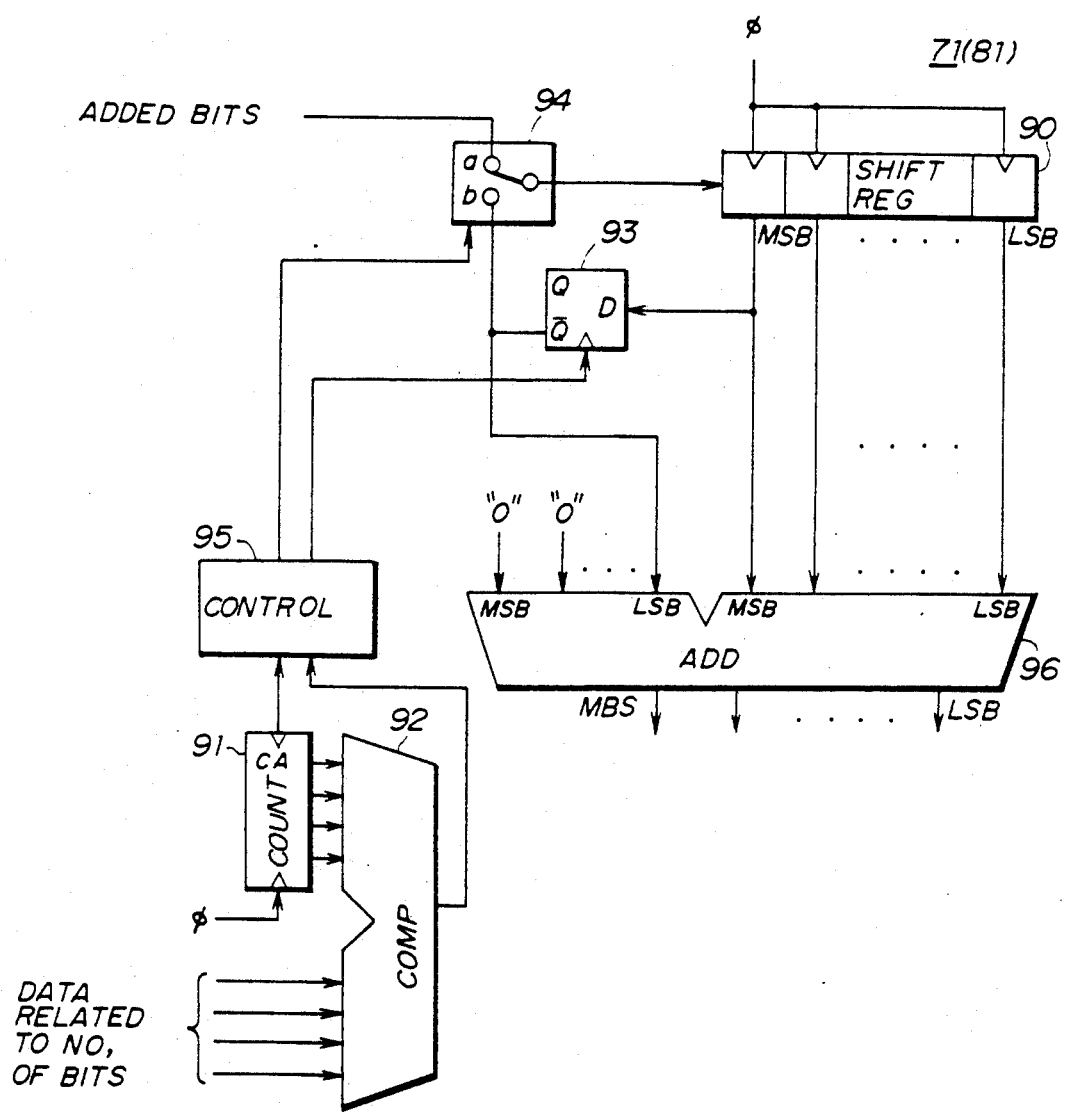
FIG. 11 is a system block diagram showing an embodiment of a data detection circuit of the third embodiment shown in FIG. 10.

FIG. 11 shows an embodiment of the data detection circuit 71. The data detection circuit 81 may have the same construction as the data detection circuit 81.

In the data detection circuit 71 shown in FIG. 11, a shift register 90 converts the input data from the ROM 70 into parallel data, and a counter 91 counts a shift clock $\phi$ of the shift register 90 to count the number of shift bits in the shift register 90. A comparator 92 compares the counted value in the counter 91 with the data which is related to the number of bits and is received from the ROM 70. Of course, in the case of the data detection circuit 81, the comparator 92 receives the data which is related to the number of bits from the corresponding ROM 80.

A latch circuit 93 holds the data related to the MSB of the shift register 90. A switching circuit 94 selectively supplies to the shift register 90 one of the added bits and an inverted output of the latch circuit 93 responsive to a control signal. A control circuit 95 generates control signals based on a carry out signal from the counter 91 and a match detection signal from the comparator 92. The control signal supplied to the latch circuit 93 controls the latch timing of the latch circuit 93, and the control signal supplied to the switching circuit 94 controls the switching timing of the switching circuit 94. An adder 96 adds the inverted output of the latch circuit 93 to the output parallel data of the shift register 90 as the LSB.

In an initial state of the data detection circuit 71, a movable contact of the switching circuit 94 is connected to a fixed terminal a, and at the same time, the counter 91 is reset. Thereafter, the added bits are successively input to the shift register 90 in response to the shift clock $\phi$. Since the counted value of the shift clock $\phi$ in the counter 91 matches the number of shift bits in the shift register 90, the comparator 92 outputs the match detection signal. As a result, the effective data which is required is input to the shift register 90 from the added bits.

Next, the control circuit 95 simultaneously generates the control signals for switching the movable contact of the switching circuit 94 to a fixed terminal b and for latching the MSB of the shift register 90. Accordingly, the inverted bit of the MSB which is latched in the latch circuit 93 is input to the shift register 90 in place of the added bits.

The shift register 90 continuous the shift operation in response to the shift clock $\phi$ in this state, and the inverted bit from the latch circuit 93 is added to the MSB side of the input effective data. Because the number of bits in the shift register 90 matches the maximum counted value in the counter 91, it can be detected that the effective data has been converted into parallel data having a predetermined number of bits when the carry out signal is output from the counter 91. This predetermined number is equal to the number of bits of the shift register 90.

For example, when converting the added bits made up of 3 bits into parallel data, the parallel data becomes "00000000101" when the value of the added bits is a positive number "101". On the other hand, when the value of the added bits is a negative number "011", the parallel data becomes "11111111011". When the value of the added bits is a negative number, the adder 96 adds the inverted output "1" of the latch circuit 93 to the value of the added bits. In this embodiment, a modulo-12 adder is used for the counter 91.

Figure 12:
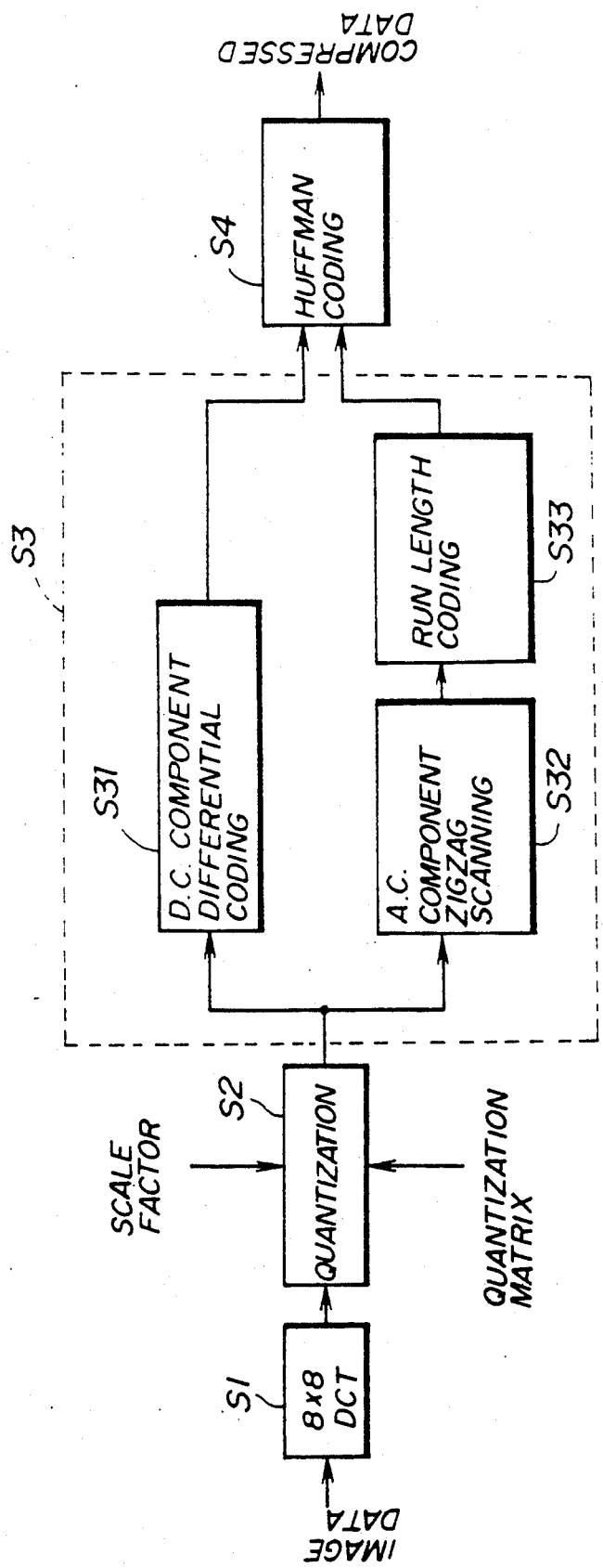
FIG. 12 is a diagram for explaining the "Baseline System" in more detail.

Before describing a fourth embodiment of the image data processing apparatus according to the present invention, a more detailed description will be given of the "Baseline System", by referring to FIG. 12. In FIG. 12, those parts which are the same as those corresponding parts in FIG. 2 are designated by the same reference numerals, and a description thereof will be omitted.

In FIG. 12, the step S3 include substeps S31, S32 and S33. The substep S31 obtains the difference of the D.C. components which are quantized in the previous and present blocks. Hence, with regard to the D.C. component, the step S4 subjects the number of bits of the difference to the Huffman coding. On the other hand, the substeps S32 and S33 are carried out with respect to the A.C. component. The substep S32 carries out the zigzag scanning within the block to convert the A.C. component into a one-dimensional sequence Ap ($p = 1, 2, \ldots, 63$), and the substep S33 subjects the number of consecutive zeros (invalid coefficients) within the sequence Ap to a run length coding. Thus, with regard to the A.C. component, the step S4 subjects the number of consecutive zeros and the number of bits of the effective coefficient to a two-dimensional Huffman coding.

Figure 13:
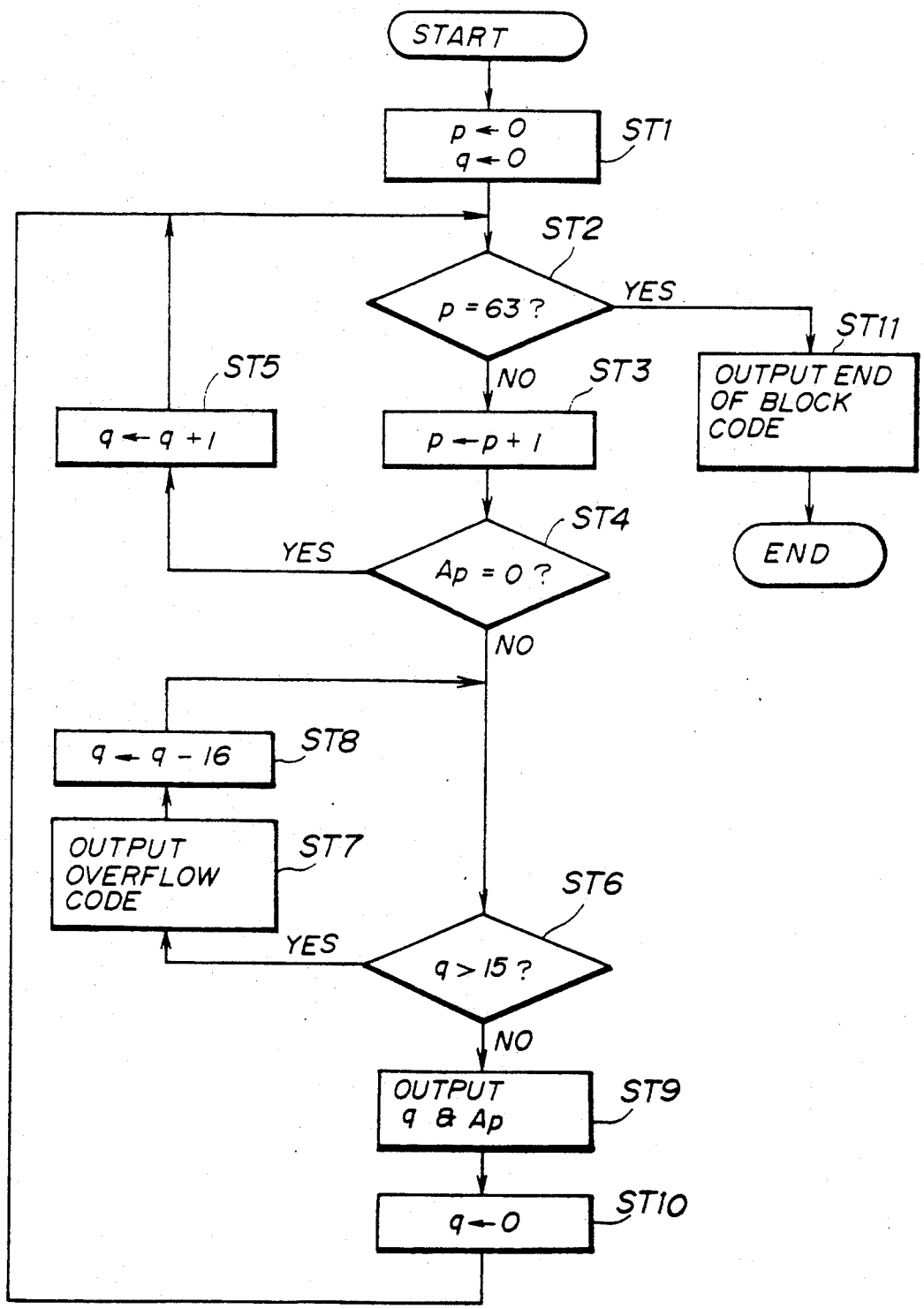
FIG. 13 is a flow chart for explaining a run length coding process shown in FIG. 12 for one block.

FIG. 13 shows a flow chart for explaining the run length coding process of the substep S33 for one block.

In FIG. 13, a step ST1 carries out an initializing process in which a variable p and a variable q are set to zero. The variable p is used to count the number ($63 = 8 \times 8 - 1$) of A.C. components within one block, and the variable q is used to count the number of consecutive zeros (invalid coefficients. Then, a step ST2 judges whether or not the variable p is "63", that is, whether or not the processing of all data corresponding to the A.C. component is ended.

When the judgement result in the step ST2 is NO, a step ST3 increments the variable p by one, and a step ST4 judges whether or not the DCT coefficient Ap is zero. When the judgement result in the step ST4 is YES, a step ST5 increments the variable q by one and the process returns to the step ST2.

On the other hand, when the judgement result in the step ST4 is NO, a step ST6 judges whether or not the variable q is greater than "15", that is, whether or not 16 or more consecutive zeros exist. When the judgement result in the step ST6 is YES, a step ST7 outputs an overflow code, a step ST8 subtracts "16" from the variable q and the process returns to the step ST6.

When the judgement result in the step ST6 is NO, a step ST9 outputs the value of the variable q (the number of consecutive zeros) and the DCT coefficient Ap which is not zero. Then, a step ST10 resets the variable q to zero and the process returns to the step ST2.

When the processing of all data corresponding to the A.C. component ends, the judgement result in the step ST2 becomes YES. In this case, a step ST11 outputs an end of block code and the data processing of one block ends.

As described above, no practical hardware has been proposed for carrying out the data compression in comformance with the "Baseline System". Hence, a description will now be given of the fourth embodiment of the image data processing apparatus according to the present invention in which the run length coding process is realized by a simple and high-speed hardware.

Figure 14:
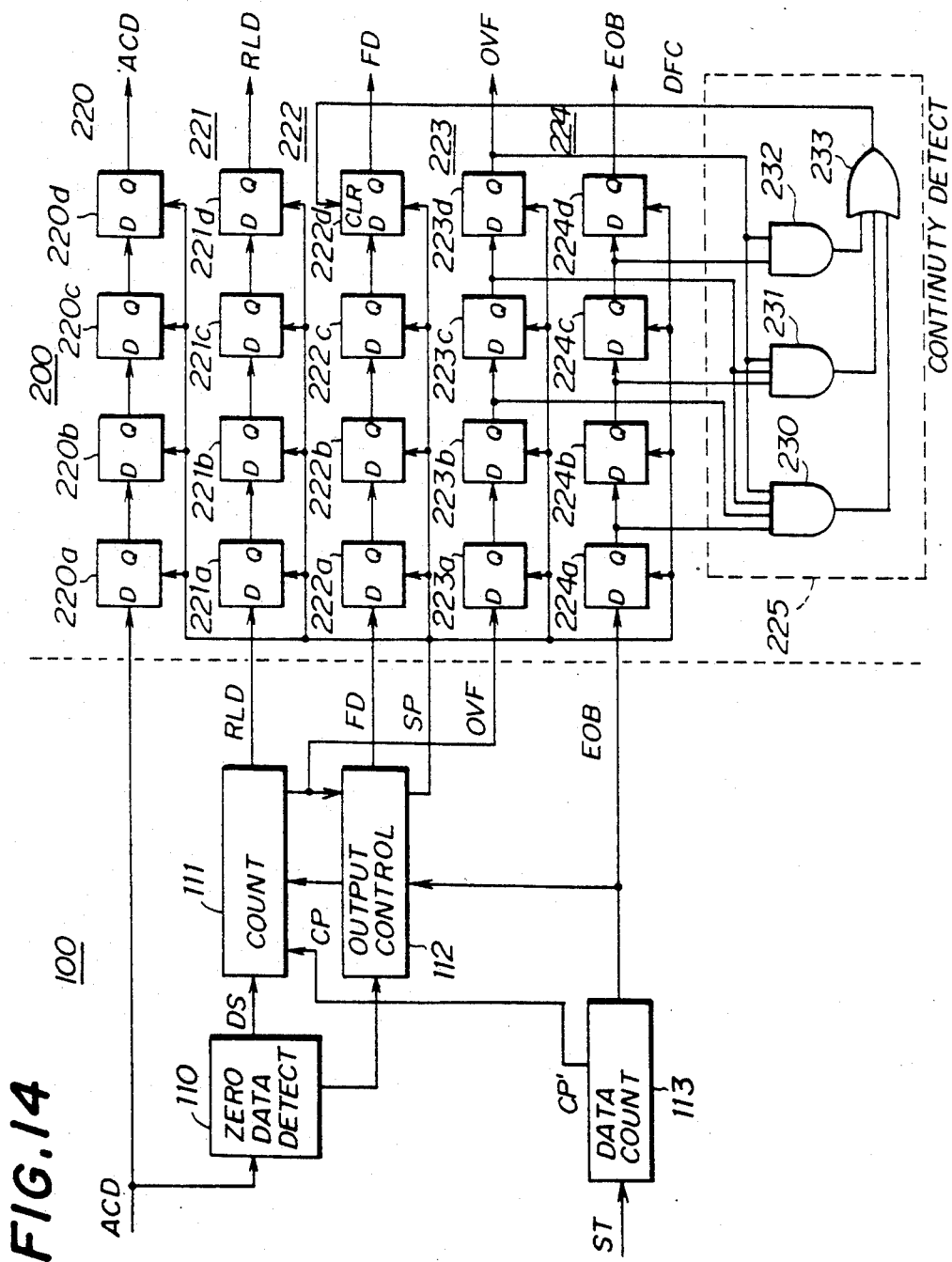
FIG. 14 is a system block diagram showing an essential part of a fourth embodiment of the image data processing apparatus according to the present invention.

FIG. 14 shows an essential part of the fourth embodiment of the image data processing apparatus according to the present invention. FIG. 14 shows a run length coding circuit including a run length counter part 100 and an overflow code erasing part 200.

The run length counter part 100 includes a zero data detector 110 for detecting whether or not an input A.C. component data ACD is zero, a counter 111 for counting the number of consecutive zeros (invalid coefficients) of the data ACD in response to an output of the zero data detector 110, an output controller 112, and a data counter 113. The output controller 112 supplies a clear pulse CP to the counter 111 when the data ACD is not zero or when the counter 111 overflows. In addition, the output controller 112 supplies a flag data FD and a shift pulse SP to shift registers 220 through 224 of the overflow code erasing part 200. The data counter 113 outputs an end of block code EOB and a clear pulse CP' when the number of data ACD is counted and it is detected that the input of the data ACD amounting to one block is ended.

The overflow code erasing part 200 includes the shift registers 220 through 224 and a continuity detector 225. The shift register 22k includes four D-type flip-flops 22ka through 22kd, where k=0, 1, 2, 3 and 4. The continuity detector 225 includes AND circuits 230 through 232 and an OR circuit 233. This continuity detector 225 detects the continuity of the overflow code OVF and the end of block code EOB.

The data ACD is directly input to the shift register 220. A run length data RLD from the counter 111 indicative of the counted value in the counter 111 is input to the shift register 221. The flag data FD from the output controller 112 is input to the shift register 222. An overflow code OVF from the counter 111 is input to the shift register 223. The end of block code EOB from the data counter 113 is input to the shift register 224. The shift pulse SP from the output controller 112 is supplied to clock terminals of each of the flip-flops making up the shift registers 220 through 224.

The AND circuit 230 of the continuity detector 225 obtains an AND of the outputs of the flip-flops 223b through 223d in the second through fourth stages of the shift register 223 and the output of the flip-flop 224a in the first stage of the shift register 224. The AND circuit 231 obtains an AND of the outputs of the flip-flops 223c and 223d in the third and fourth stages of the shift register 223 and the output of the flip-flop 224b in the second stage of the shift register 224. The AND circuit 232 obtains an AND of the output of the flip-flop 223d in the fourth stage of the shift register 223 and the output of the flip-flop 224c in the third stage of the shift register 224. The OR circuit 233 obtains an OR of the outputs of the AND circuits 230 through 232. The output of the OR circuit 233 is supplied to a clear terminal CLR of the flip-flop 222d in the fourth stage of the shift register 222.

Figure 15:
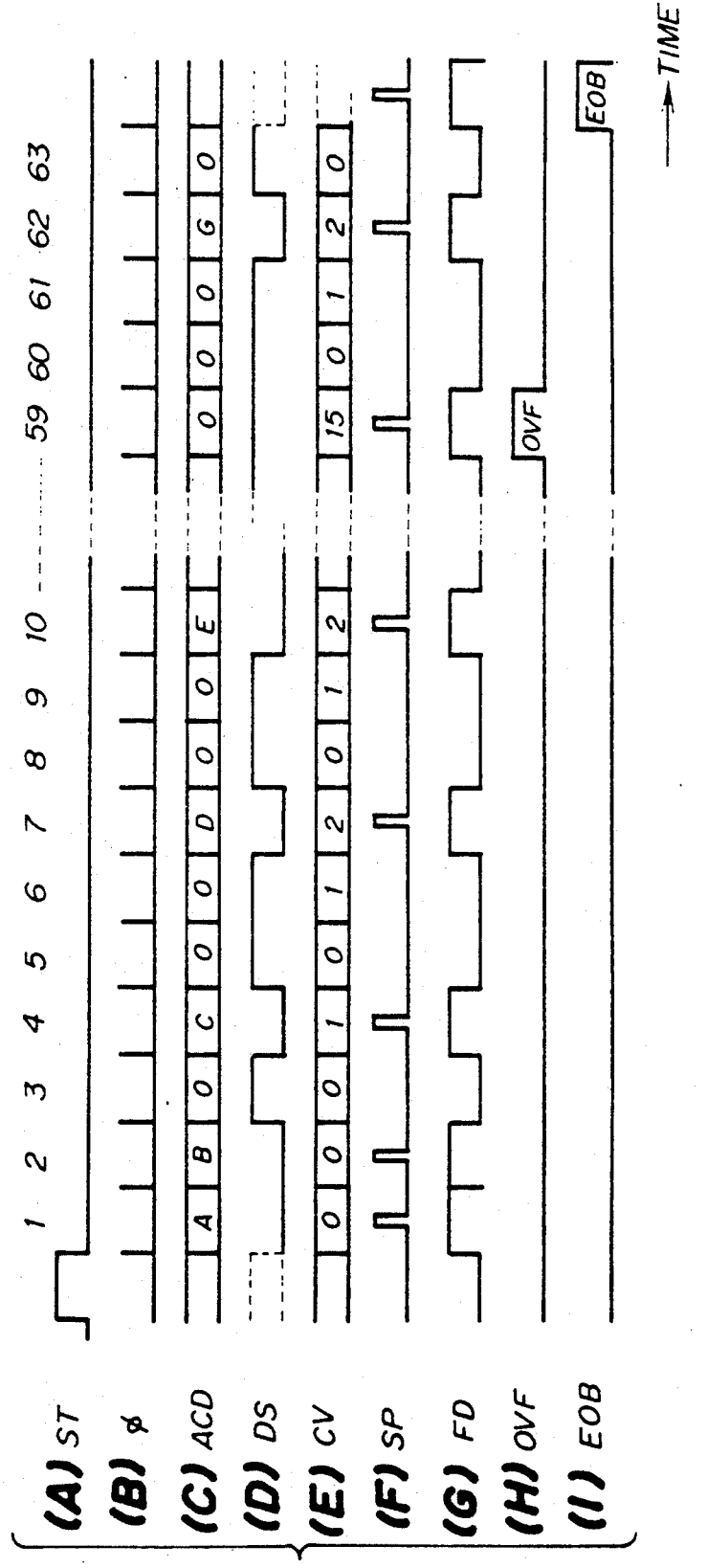
FIG. 15 is a timing chart for explaining an operation of the fourth embodiment shown in FIG. 14.

Next, a description will be given of the fourth embodiment by referring to the timing chart shown in FIG. 15. A start pulse ST shown in FIG. 15(A) is supplied to the data counter 113 to clear the data counter 113. At the same time, the clear pulse CP' is output from the data counter 113 to clear the counter 111. Then, the data ACD shown in FIG. 15(C) is input to the zero data detector 110 in synchronism with the clock pulse $\phi$ shown in FIG. 15(B). The clock pulse $\phi$ is supplied to various parts of the image data processing apparatus for controlling various operation timings. The zero data detector 110 detects whether or not the data ACD is a zero data, and outputs a detection signal DS shown in FIG. 15(D). When the zero data detector 110 detects that the data ACD is not a zero data, the output controller 112 outputs the shift pulse SP shown in FIG. 15(F). Hence, the data ACD is latched in the flip-flop 220a in the first stage of the shift register 220. At the same time, the flag data FD shown in FIG. 15(G) from the output controller 112 is latched in the flip-flop 222a in the first stage of the shift register 222. In addition, the counter 111 is cleared by the clear pulse CP from the output controller 112.

When the data ACD is a zero data, the counter 111 increments a counted value CV shown in FIG. 15(E) in response to the detection signal DS shown in FIG. 15(D). This counted value CV corresponds to the run length data RLD. When the zero data continues, the number of successive zero data is counted in the counter 111.

Next, when an effective data is input to the zero data detector 110 as the data ACD, the output controller 112 outputs the shift pulse SP shown in FIG. 15(F) and the flag data FD shown in FIG. 15(G). Responsive to the shift pulse SP, the data ACD is latched in the flip-flop 220a in the first stage of the shift register 220, the counted value CV (run length data RLD) is latched in the flip-flop 221a in the first stage of the shift register 221, and the flag data FD is latched in the flip-flop 222a in the first stage of the shift register 222. In addition, the counter 111 is cleared responsive to the clear pulse CP.

When the zero data continues as the data ACD and the counted value CV in the counter 111 exceeds "15", the overflow code OVF shown in FIG. 15(H) is output from the counter 111 and supplied to the output controller 112. The output controller 112 outputs the shift pulse SP and the flag data FD responsive to the overflow code OVF, so that responsive to the shift pulse SP the zero data of the data ACD is latched in the flip-flop 220a in the first stage of the shift register 220, the run length data RLD is latched in the flip-flop 221a in the first stage of the shift register 221, the flag data DF is latched in the flip-flop 222a in the first stage of the shift register 222 and the overflow code OVF is latched in the flip-flop 223a in the first stage of the shift register 223.

When all of the A.C. component data ACD related to one block are input to the run length counter part 100, the data counter 113 outputs the end of block code EOB shown in FIG. 15(I). The output controller 112 outputs the shift pulse SP and the flag data FD responsive to the end of block code EOB, so that the data ACD is latched in the flip-flop 220a in the first stage of the shift register 220, the run length data RLD is latched in the flip-flop 221a in the first stage of the shift register 221, the flag data FD is latched in the flip-flop 222a in the first stage of the shift register 222 and the end of block code EOB is latched in the flip-flop 224a in the first stage of the shift register 224.

Therefore, the data shown in FIG. 15(C), (E), (G), (H) and (I) are respectively latched in the flip-flops 220a through 224a in the respective first stages of the shift registers 220 through 224.

Figure 16:
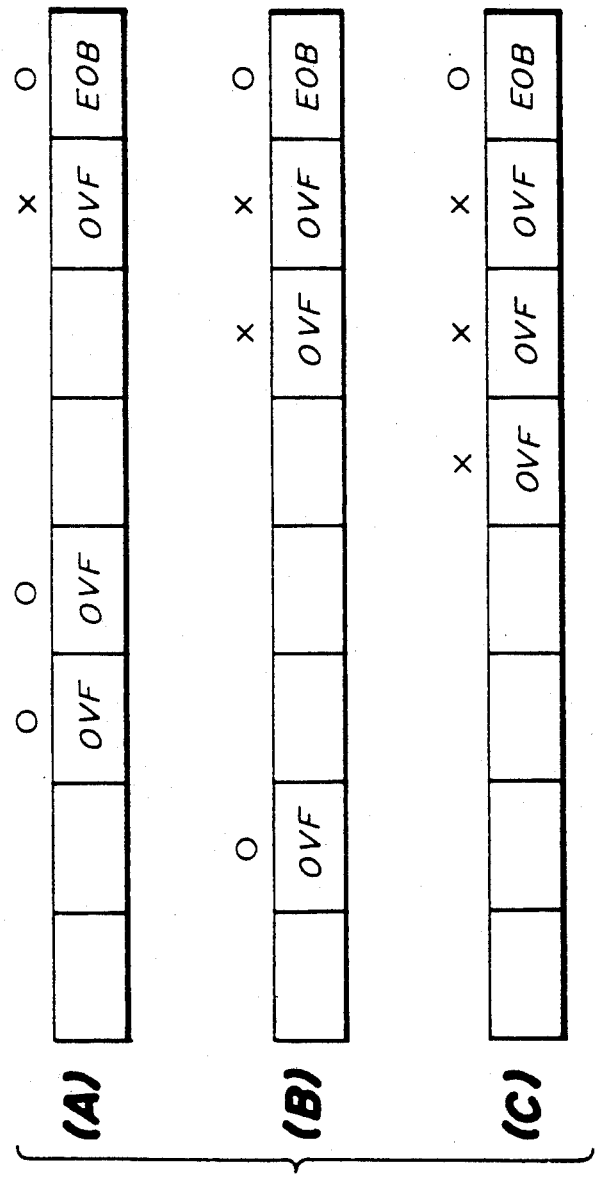
FIG. 16 is a diagram showing data structures for explaining an operation of a continuity detector shown in FIG. 14.

Next, a description will be given of the operation of the continuity detector 225 by referring to FIG. 16 which shows data structures.

When the zero data of the data ACD continues to the end of block code EOB, the continuity detector 225 erases the overflow code OVF adjacent to the end of block code EOB. The data ACD is made up of 63 data per block, and a maximum number of times 16 zero data continues within one block is three. In addition, there are three cases where the overflow code OVF and the end of block code EOB are successive, as shown in FIG. 16(A), (B) and (C). Hence, in the case shown in FIG. 16(C) where a maximum of three overflow code OVF continue and the end of block EOB follows thereafter, it is necessary to detect the continuity of four successive data. For this reason, this embodiment uses the shift registers 220 through 224 respectively having the 4-stage structure, and the continuity of the four successive data is detected from the outputs from each stage of the shift register 223 which receives the overflow code OVF and the outputs from each stage of the shift register 224 which receives the end of block code EOB. In FIG. 16, the overflow code OVF having a sign "c" on top indicates the data to be output, and the overflow code OVF having a sign "x" on top indicates the data to be erased.

First, the end of block code EOB is latched in the flip-flop 224c of the shift register 224. At the same time, when the overflow code OVF is latched in the flip-flop 223d of the shift register 223, the AND condition in the AND circuit 232 stands and a data flag clear pulse DFC is output from the OR circuit 233. This corresponds to the case shown in FIG. 16(A).

If the overflow code OVF is latched in the flip-flops 223c through 223d of the shift register 223 when the end of block code EOB is latched in the flip-flop 224b of the shift register 224 is latched, the AND condition in the AND circuit 231 stands and the data flag clear pulse DFC is output from the OR circuit 233. This corresponds to the case shown in FIG. 16(B).

If the overflow code OVF is latched in each of the flip-flops 223b through 223d of the shift register 223 when the end of block code EOB is latched in the flip-flop 224a of the shift register 224, the AND condition in the AND circuit 230 stands and the data flag clear pulse DFC is output from the OR circuit 233. This corresponds to the case shown in FIG. 16(C).

The data flag clear pulse DFC output from the continuity detector 225 is supplied to the clear terminal CLR of the flip-flop 222d of the shift register 222. Hence, the flag data FD which is latched in the flip-flop 222d is cleared and the corresponding overflow code OVF is invalidated. As a result, the overflow code OVF adjacent to the end of block code EOB is erased and only the end of block code EOB is output.

According to this embodiment, the counter 111 for counting the number of successive zeros need only have four bits. Hence, it is possible to realize the run length coding with a simple but high-speed hardware, without the need of a complex judgement process.

Further, the present invention is not limited to these embodiments, but various variations and modifications may be made without departing from the scope of the present invention.

What is claimed is:

1. An image data processing apparatus for processing an input image data which is related to an input image and includes a plurality of blocks which are respectively made up of N×N pixels, where N is an integer greater than or equal to two, said image data processing apparatus comprising:
   converter means for subjecting each block to a discrete cosine transform to convert the blocks into discrete cosine transform coefficients;
   first memory means coupled to said converter means for temporarily storing the discrete cosine transform coefficients;
   second memory means for storing threshold values of a quantization matrix which is used for quantizing the discrete cosine transform coefficients;
   quantizing means coupled to said first and second memory means for quantizing the discrete cosine transform coefficients read out from said first memory means by dividing the discrete cosine transform coefficients by each of the threshold values read out from said second memory means;
   differential means coupled to said quantizing means for obtaining a difference in D.C. components of quantized discrete cosine transform coefficients output from said quantizing means and related to present and previous blocks;
   zero detection means coupled to said quantizing means for detecting whether or not A.C. components of the quantized discrete cosine transform coefficients output from said quantizing means are zero coefficients;
   counter means coupled to said zero detection means for counting a number of successive zero coefficients of the A.C. components;
   coding means for subjecting the D.C. components to a Huffman coding by coding the difference output from said differential means to output a coded D.C. component, and for subjecting the A.C. components to a Huffman coding by coding outputs of said zero detection means and said counter means to output a coded A.C. component;
   first register means for storing an address of an arbitrary discrete cosine transform coefficient out of the N×N discrete cosine transform coefficients of one block in response to an external address data;
   comparator means coupled to said first register means for comparing an address where the discrete cosine transform coefficient output from said converter means is stored in said first memory means and the address stored in said first register means; and
   second register means coupled to said converter means and said comparator means for holding the discrete cosine transform coefficient output from said converter means when the two compared addresses match in said comparator means.

2. The image data processing apparatus as claimed in claim 1, which further comprises averaging means for obtaining an average value of the discrete cosine transform coefficients output from said second register means.

3. The image data processing apparatus as claimed in claim 2, wherein said input image data relates to luminance information, and said averaging means obtains an average of the D.C. components of the discrete cosine transform coefficients output from said second register means.

4. The image data processing apparatus as claimed in claim 3, wherein said image data processing apparatus is an electronic still camera, and said average value is used for an exposure adjustment of said electronic still camera.

5. The image data processing apparatus as claimed in claim 2, wherein said input image data relates to chrominance information, and said averaging means obtains an average of the D.C. components of the discrete cosine transform coefficients output from said second register means.

6. The image data processing apparatus as claimed in claim 5, wherein said image data processing apparatus is an electronic still camera, and said average value is used for a white balance adjustment of said electronic still camera.

7. The image data processing apparatus as claimed in claim 2, wherein said input image data relates to chrominance information, and said averaging means obtains an average of the A.C. components of the discrete cosine transform coefficients which have the same order and are output from said second register means for all blocks of the input image.

8. The image data processing apparatus as claimed in claim 7, wherein said image data processing apparatus is an electronic still camera, and said average value is used for a focal adjustment of said electronic still camera.

9. The image data processing apparatus as claimed in claim 1, wherein said coding means includes third memory means for storing first and second tables which are respectively used for subjecting the D.C. components and the A.C. components to the Huffman coding, an access to said first table being made by the difference output from said differential means to output the coded D.C. component, an access to said second table being made by the outputs of said zero detection means and said counter means to output the coded A.C. component.

10. The image data processing apparatus as claimed in claim 1, wherein said coding means includes first size detection means for detecting a size which is a number of bits required to describe the D.C. component of the quantized discrete cosine transform coefficient responsive to the difference output from said differential means, first masking means for outputting only a first number of effective lower bits of the difference output from said differential means depending on the size output from said first size detection means, and third memory means for storing a Huffman table which is used for subjecting the D.C. components to the Huffman coding, an access to said first table being made by the size output from said first size detection means to output the coded D.C. component, said coded D.C. component from said third memory means and said first effective lower bits output from said first masking means being output as compressed D.C. data.

11. The image data processing apparatus as claimed in claim 10, wherein said coding means further include second size detection means for detecting a size which is a number of bits required to describe the A.C. component of the quantized discrete cosine transform coefficient output from said quantizing means, second masking means for outputting only a second number of effective lower bits of the quantized discrete cosine transform coefficient output from said quantizing means depending on the size output from said second size detection means, and fourth memory means for storing a Huffman table which is used for subjecting the A.C. components to the Huffman coding, an access to said second table being made by the size output from said second size detection means to output the coded A.C. component, said coded A.C. component from said third memory means and said second effective lower bits output from said second masking means being output as compressed A.C. data.

12. The image data processing apparatus as claimed in claim 11, which further comprises:
   decoding means for decoding the compressed D.C. data and the compressed A.C. data by a Huffman decoding and for outputting decoded D.C. component and decoded A.C. component;
   data detection means coupled to said decoding means for extracting the first and second effective lower bits from the respective decoded D.C. and A.C. components;
   differential decoding means coupled to said data detection means for subjecting the first effective lower bits of the decoded D.C. component to a differential decoding;
   zero adding means for adding to the second effective lower bits of the decoded A.C. component a number of consecutive zero coefficients decoded by said decoding means;
   fifth memory means for storing threshold values of a quantization matrix which is used for inverse quantization of the discrete cosine transform coefficients;
   multiplying means for subjecting the D.C. component output from said differential decoding means and the A.C. component output from said zero adding means to an inverse quantization by multiplying each threshold value read out from said fifth memory means to the D.C. and A.C. components;
   sixth memory means for temporarily storing the D.C. and A.C. components output from said multiplying means; and
   inverse discrete cosine transform means for subjecting the D.C. and A.C. components read out from said sixth memory means to an inverse discrete cosine transform to convert the discrete cosine transform coefficients into the blocks.

13. The image data processing apparatus as claimed in claim 1, which further comprises run length counter means and overflow code erasing means, said run length counter means comprising:
   said zero detection means for detecting whether or not the A.C. components of the quantized discrete cosine transform coefficients output from said quantizing means are zero coefficients;
   said counter means coupled to said zero detection means for counting the number of successive zero coefficients of the A.C. components and for outputting a counted value as a run length data;
   a data counter for counting a number of input data within each block and for outputting an end of block code when n input data are counted, where n denotes a number of input data within one block, said data counter outputting an overflow code when a counted value therein overflows; and
   an output controller for outputting a flag data and a shift pulse when said zero detection means detects a non-zero coefficient, the overflow code is output from said counter means or the end of block code is output from said data counter, and said overflow code erasing means comprises:

shift register means for latching the input data, the run length data, the flag data, the overflow code and the end of block code in response to the shift pulse; and a continuity detector for detecting the overflow code which is adjacent to the end of block code out of the overflow code and the end of block code latched in said shift register means, and for erasing the overflow code by clearing the flag data which corresponds to the detected overflow code.

* * * * *